United States Patent
Raghavendran et al.

(10) Patent No.: US 11,447,622 B2
(45) Date of Patent: Sep. 20, 2022

(54) MOLDING COMPOSITION AND ARTICLES FORMED THEREOF

(71) Applicant: Kraton Polymers LLC, Houston, TX (US)

(72) Inventors: Venkat Raghavendran, Houston, TX (US); Kathryn Wright, Houston, TX (US); Aaron Brothers, Houston, TX (US)

(73) Assignee: KRATON POLYMERS LLC, Houston, TX (US)

( * ) Notice: Subject to any disclaimer, the term of this patent is extended or adjusted under 35 U.S.C. 154(b) by 102 days.

(21) Appl. No.: 16/947,077

(22) Filed: Jul. 17, 2020

(65) Prior Publication Data

US 2021/0017365 A1    Jan. 21, 2021

Related U.S. Application Data

(60) Provisional application No. 62/876,148, filed on Jul. 19, 2019.

(51) Int. Cl.

| | |
|---|---|
| *C08L 23/12* | (2006.01) |
| *C08K 3/014* | (2018.01) |
| *B29C 45/00* | (2006.01) |
| *C08J 3/12* | (2006.01) |
| *C08L 23/14* | (2006.01) |
| *C08L 53/02* | (2006.01) |
| *C08K 3/013* | (2018.01) |
| *B29K 23/00* | (2006.01) |
| *B29K 25/00* | (2006.01) |
| *C08K 5/00* | (2006.01) |

(52) U.S. Cl.
CPC .......... *C08L 23/12* (2013.01); *B29C 45/0001* (2013.01); *C08J 3/124* (2013.01); *C08K 3/014* (2018.01); *C08L 23/14* (2013.01); *C08L 53/025* (2013.01); *B29K 2023/12* (2013.01); *B29K 2025/04* (2013.01); *C08J 2325/10* (2013.01); *C08K 3/013* (2018.01); *C08K 5/005* (2013.01); *C08K 5/0066* (2013.01)

(58) Field of Classification Search
CPC ....................................................... C08L 23/12
See application file for complete search history.

(56) References Cited

U.S. PATENT DOCUMENTS

| | | |
|---|---|---|
| 3,595,942 A | 7/1971 | Wald et al. |
| 3,634,549 A | 1/1972 | Shaw et al. |
| 3,670,054 A | 6/1972 | De La Mare et al. |
| 3,700,633 A | 10/1972 | Wald et al. |
| 5,837,769 A | 11/1998 | Graafland et al. |
| 8,445,087 B2 | 5/2013 | Hansen et al. |
| 2020/0317922 A1* | 10/2020 | Brothers ............. B29C 45/0001 |

FOREIGN PATENT DOCUMENTS

| | | |
|---|---|---|
| WO | 199700294 A1 | 1/1997 |
| WO | 1999032558 A1 | 7/1999 |
| WO | 200142353 A1 | 6/2001 |

* cited by examiner

*Primary Examiner* — Arrie L Reuther

(57) ABSTRACT

Articles having improved properties are disclosed. The articles are formed from a composition obtained by dry blending: a) 70-95 wt. % of a polyolefin polymer selected from polypropylene homopolymers, polypropylene copolymers, polypropylene impact copolymers, and mixtures thereof; and b) 5 to 30 wt. % of a free-flowing styrenic block copolymer coated with a functional dusting agent having a maximum particle size of 100 microns. The free-flowing styrenic block copolymer requires less than 400 lbs/ft$^2$ of force to break in a blocking test. The molded article has improved impact strength and haze.

20 Claims, No Drawings

MOLDING COMPOSITION AND ARTICLES FORMED THEREOF

RELATED APPLICATIONS

This application claims benefit to U.S. provisional application Ser. No. 62/876,148 with a filing date of Jul. 19, 2019, the entire disclosure of which is incorporated herein by reference.

FIELD

This disclosure relates to a molding composition comprising a free-flowing elastomeric block copolymer.

BACKGROUND

Thermoplastic elastomers are used in molding composition comprising polypropylene and/or polypropylene random copolymers. Some HSBC shows a high cohesive strength, resulting in pellets, granulate or crumb of the composition agglomerate forming large clumps of granules, when the product is kept on stock, for example when stacked up in sacks, bags, Gaylords, cartons, or kept in a silo. It is even possible that an entire sack, bag, Gaylord, carton, or silo is filled with a mass of pellets or granules all or virtually all agglomerated into a single mass. Once the granulate agglomerates together, it has to be broken up with force to transport the pellets or granulate into the feed opening of relevant processing equipment such as a mixer or an extruder. U.S. Pat. No. 5,837,769 provides a free-flowing elastomer powder with the addition of "significant amounts" of a plasticizing oil.

There is a need for improved free-flowing HSBC compositions with solid flow characteristics, and molding compositions comprising free-flowing HSBC compositions for molding applications with improved properties including low haze.

SUMMARY

In one aspect, a composition is provided, comprising: a) 70-95 wt. % of a polyolefin polymer selected from polypropylene homopolymers, polypropylene copolymers, polypropylene impact copolymers, and mixtures thereof; and b) 5 to 30 wt. % of a free-flowing styrenic block copolymer ("FFSBC"). In embodiments, the composition consists essentially of: a) 70-95 wt. % of a polyolefin polymer selected from polypropylene homopolymers, polypropylene copolymers, polypropylene impact copolymers, and mixtures thereof; and b) 5 to 30 wt. % of a free-flowing styrenic block copolymer ("FFSBC"). The FFSBC is a styrenic block copolymer (SBC) coated with a functional dusting agent having a maximum particle size of 100 microns in an amount of up to 2 wt. % (based on the total weight of the SBC). The functional dusting agent is selected from modified sorbitols, benzoic acid salts, substituted benzoic acid salts, dicarboxylate metal salts, hexahydrophthalic acid metal salts, phenylphosphonic acid salts, phosphate ester salts, glycerolate salts, norbornane carboxylic acid salts, diamides, trisamides and derivatives thereof, tetramides, pine rosin derivatives, acetals and derivatives thereof, diacetal derivatives, 2,6-naphthalene dicarboxamides, polyvinylcyclohexanes and combinations thereof. The coated SBC is free-flowing, requiring less than 400 lbs/ft$^2$ to break in a blocking test.

In another aspect, a process for making an article from the above molding composition is disclosed. The process comprises (i) providing the SBC described above, (ii) dry blending the SBC with a polyolefin to form a dry blended composition having 5-30 wt. % of the SBC and 70-95 wt. % of the polyolefin, (iii) forming an article from the dry-blended composition. In embodiments, the process consists essentially of: (i) providing the SBC described above, (ii) dry blending the SBC with a polyolefin to form a dry blended composition having 5-30 wt. % of the SBC and 70-95 wt. % of the polyolefin, (iii) forming an article from the dry-blended composition. The article has a notched Izod impact strength of 42 J/m or higher, measured at 23° C. in accordance with ASTM D256, and a haze value, measured according to ASTM D1003, of 95% or lower. The article may be formed by any of injection molding, extrusion, extrusion blow molding, rotational molding, thermal forming, and injection blow molding.

DESCRIPTION

The following terms are used in the specification with the following meanings:

"Block cylinder" refers to a cylinder having an internal diameter of about 61 mm, a length of 128 mm, that can be opened along the side(s) as well as the top and bottom.

"Blocking test" refers to a test in which the block cylinder is filled with granules and/or crumbs with a length of approximately ⅔ to full. Weights of approximately 5.0 to 7.0 lbs are placed onto each crumb or granule sample inside the block cylinder. The assembly is placed in an oven at a temperature of 110° F. (43° C.). After 7 days, the cylinder is removed from the oven and weight is removed. Both top and bottom of the cylinder are removed, and the cylinder is opened at the side. The sample (of crumbs or granules) is placed onto a test holder as a block for observation and further testing. Weight can be slowly added on top of the sample block until the sample block collapses into crumb. Some samples may crumble immediately into free-flowing crumbs as they are removed from the cylinder and placed onto the test holder, some may crumble on the outside but can still be fused together in a core center, requiring some force to break the fused core, and some stay as a block that would need force or weight to break the sample block into crumbs.

"Crumb" may be used interchangeably with "granules," referring to the particle comprising the block copolymer isolated by coagulation from a solvent, and without being ground to a fine particle size. The particle size of the crumb can be larger than 2 μm and less than 5000 μm, or less than 2000 μm, or from 500 to 2000 μm (35 mesh screen), or from 300 to about 2000 μm, or larger than 5 μm, or between 100 and 700 μm, or between 150 and 600 μm.

"Force to break" or "breaking force" (in a blocking test) refers to the force in lbs/ft$^2$ required to break a sample block of aggregated crumbs placed in the test holder.

"Free-flowing" means a composition requiring a force (or breaking force) of less than 400 lbs/ft$^2$ to break the sample block of crumbs or granules in a blocking test. In some embodiments, the force required can be less than 300 lbs/ft$^2$.

"Functional dusting agents" refer to additives that form nuclei or provide sites for the formation and/or growth of crystals in a polymer as it solidifies from a molten state.

"Impact strength" refers to the notched Izod impact strength of a sample, such as a molded article, measured at 23° C. using ASTM D256, and is expressed in J/m.

"Molecular weight" or "Mp" refers to the styrene equivalent molecular weight in g/mol of a polymer or a block copolymer. The molecular weights can be measured with gel permeation chromatography (GPC) using polystyrene calibration standards, such as is done according to ASTM 5296-19. The chromatograph is calibrated using commercially available polystyrene molecular weight standards. The molecular weight of polymers measured using GPC so calibrated are styrene equivalent molecular weights. The detector can be a combination ultraviolet and refractive index detector. The molecular weights expressed herein are measured at the peak of the GPC trace, and expressed as styrene equivalent molecular weight or apparent molecular weight, and are commonly referred to as "peak molecular weights," designated as Mp. Unless indicated otherwise, the molecular weights refer to the peak styrene equivalent molecular weights.

"Pellets" refers to the granules comprising the copolymer melt extruded and cut to form solid short cylinders or oval shapes. The length of the pellet is generally larger than 400 µm and less than 5000 µm, and the diameter of the pellet is generally more than 300 µm and less than 3000 µm.

"Dry-blended" refers to the mechanical blending of components with minimal or no heat input, e.g, in a drum tumbler, ribbon blender, Henschel mixer. The resulting dry blended material can be used for processes such as extrusion or injection molding.

"Pre-compounded" or "pre-compounding" (or compounding) refers to the melt-blending of components and further processing, e.g., in an extruder, to form pellets or powder, for use in other plastic forming processes to form articles, such as extrusion or injection molding. Pre-compounding requires an additional melt-blending step, separate from dry blending and plastic forming processes, to form articles, such as by extrusion or injection molding.

"Vinyl" refers to the presence of a pendant vinyl group on the polymer chain in the styrenic block copolymer. The pendant vinyl group arises when a conjugated diene adds across only one of the 2 double bonds of the diene.

"Haze" means the percentage of transmitted light that upon passing through a specimen is scattered greater than 2.5 degrees from the normal. Haze is measured according to ASTM D1003 test method. A higher haze value indicates greater scattering.

"Monovinyl aromatic hydrocarbon" and "mono alkenyl arene" are used interchangeably.

The disclosure relates to a composition for use in injection molding or extrusion, comprising at least a polyolefin and a free-flowing styrenic block copolymer (FFSBC), wherein the styrenic block copolymer is coated with a functional dusting agent, e.g., a nucleating agent having a particle size of 100 microns or less. Molded articles formed from the composition have improved haze and impact strength properties, compared to molded compositions made from a pre-compounded composition, where the pre-compounded composition is made by melt compounding the same amount of functional dusting agent, polyolefin and styrenic block copolymer.

Polyolefin Component

The polyolefin can be selected from polypropylene homopolymers (e.g., atactic polypropylene homopolymer, isotactic polypropylene homopolymer, and syndiotactic polypropylene homopolymer), polypropylene copolymers (e.g., polypropylene random copolymers), polypropylene impact copolymers, and mixtures thereof. Suitable polypropylene copolymers include, but are not limited to, random copolymers made from the polymerization of propylene in the presence of a comonomer selected from ethylene, but-1-ene (i.e., 1-butene), and hex-1-ene (i.e., 1-hexene). In polypropylene random copolymers, the comonomer can be present in any suitable amount, but typically less than 10 wt. %. Suitable polypropylene impact copolymers include, but are not limited to, those produced by combining any proportion of a polypropylene homopolymer or polypropylene random copolymer with a copolymer selected from ethylene-propylene rubber (EPR), ethylenepropylene-diene monomer (EPDM), polyethylene, and plastomers. In such polypropylene impact copolymers, typically, the copolymer component is used in an amount from 5-25 wt. %.

In embodiments, the polyolefin polymer is selected from polypropylene homopolymers, polypropylene random copolymers, polypropylene impact copolymers, and mixtures thereof. In embodiments, the polyolefin component is a mixture of polyethylene copolymer and polypropylene or polypropylene random copolymer, where the polyethylene copolymer has an average refractive index that is +/−0.008, or less, as compared to the refractive index of the polypropylene or polypropylene copolymer in the mixture. In embodiments, the polyolefin is a polypropylene resin having a melt flow rate of >20 g/10 min, or at least 30 g/10 min, or >40 g/10 min, or less than 50 g/10 min, or from 6.0 to 20 g/10 min.

The polyolefin polymers can be branched or cross-linked, such as those formed by using additives that increase the melt strength of the polymer.

The polyolefin polymers can also contain additives such as nucleating agents, nucleators, clarifying agents, antioxidant agents, UV stabilizers, oxygen scavengers, optical brighteners, anti-slip agents, anti-blocking agents, friction modifiers, waxes, pigments, coloring dyes, and mixtures thereof. These additives can be incorporated in the commercial polyolefins during the time of production.

The polyolefin polymer component is present in the composition in amounts of up to 95 wt. %, or 70-95 wt. %, or 75-85 wt. %, or 90-95 wt. %.

Free-Flowing Styrenic Block Copolymer

The composition further comprises a free-flowing styrenic block copolymer ("FFSBC"), where a styrenic block copolymer (SBC) is coated with a functional dusting agent, e.g., a nucleating agent having a maximum particle size of 100 microns.

The SBC component comprises at least one poly(monovinyl aromatic hydrocarbon) block and at least one hydrogenated or unhydrogenated poly(conjugated diene) block. The block copolymer can have a linear, radial or star-shaped structure, e.g., a styrenic diblock copolymer of formula A-B, or a linear triblock copolymer of formula A-B-A, and/or a multi-arm coupled block copolymer of formula $(A-B)_nX$, where A is a monoalkenyl arene block, B is a conjugated diene block, n is an integer from 2 to 6, and X is the residue of a coupling agent, and mixtures thereof.

In an embodiment, the SBC comprises any of: a) a tetra-branched block copolymer (IV) having a peak molecular weight (Mp) of 53,600 to 1,000,000 represented by the general formula $(A-B)_4X$; b) a tri-branched block copolymer (III) having a Mp of 40,200 to 750,000 represented by the general formula $(A-B)_3X$; c) a di-branched block copolymer (II) having a Mp of 26,800 to 500,000 represented by the general formula $(A-B)_2X$; and d) a linear diblock copolymer (I) having a Mp of 13,400 to 250,000 represented by the general formula A-B; where: A represents a polymer block of a mono alkenyl arene; B represents a polymer block of at least one conjugated diene; and X represents the residue of a coupling agent. In embodiments, X represents the residue of an alkoxy silane coupling agent. In an embodiment, X is a residue of an alkoxy silane coupling agent. In another embodiment, the Mp of the block copolymer having the configuration $(AB)_nX$, where n is equal to 3, prior to hydrogenation, ranges from about 170,000 g/mol to about 230,000 g/mol.

In yet another aspect, the SBC is a diblock copolymer comprising one block of a monovinylaromatic hydrocarbon and one block of a conjugated diene having a Mp from 13,400 g/mol to 250,000 g/mol, a vinyl content from 5 to 80 mol % based on the number of repeat monomer units in the conjugated diene block, and a polystyrene content from 20 wt. % to 55 wt. %.

In yet another aspect, the SBC consists essentially of a triblock copolymer having at least two blocks of monovinylaromatic hydrocarbon and at least one block of conjugated diene, the triblock copolymer is selected from the group consisting of linear block copolymers having a sequential A-B-A structure with a MP of from 20,000 to 500,000 g/mol, or radial triblock copolymers having coupled (A-B)nX structure, n is an integer from 2 to 6 and X is the residue of a coupling agent, with a Mp of the A-B arm is from 10,000 g/mol to 250,000 g/mol, a vinyl content from 5 to 80 mol. % based on the number of repeat monomer units in the conjugated diene block, a polystyrene content from 10% to 40%; and a melt index from about <1 g/10 min. to 1,000 g/10 min. as determined by ASTM D-1238, condition G (200° C., 5 kg).

In embodiments, the SBC is a triblock copolymer A-B-A, based on a mono alkenyl arene, e.g., styrene (A block), with the "B" block being a rubber (e.g., butadiene, isoprene. etc.) or hydrogenated rubber (e.g., ethylene/propylene or ethylene/butylene or ethylene/ethylene/propylene). In yet another embodiment, mixtures of different block copolymers may be used, for instance an AB/ABA block copolymer mixture with A and B as defined above.

In embodiments, the SBC is a triblock copolymer having any of the structures: styrene-ethylene-propylene-styrene (SEPS), styrene-ethylene-butylene-styrene (SEBS), and styrene-ethylene-ethylene-propylene-styrene (SEEPS), of the structure A-B-A or coupled (A-B)nX where X is the remnant of a coupling agent. The triblock copolymer has a Mp from 26,800 g/mol to 500,000 g/mol, a vinyl content from 5 to 80 mole percent based on the number of repeat monomer units in the conjugated diene block, a polystyrene content from 10% to 40%, and a melt index from 0.1 g/10 min. to 2000 g/10 min (ASTM D-1238, condition G (200° C., 5 kg). In embodiments, the content of the butylene units in the ethylene/butylene block (EB) of the copolymer can be at least 30 mol %, or at least 45 mol %, or at least 60 mol %.

In embodiments, the triblock or tetra-branched SBC block copolymer is characterized as having at least 10 wt. % polystyrene content (PSC), preferably 20 wt. % to 40 wt. %. In embodiments, the triblock copolymer has a structure $(A-B)_2X$ with a Mp of at least 26,800 g/mol, preferably 26,800 g/mol to 500,000 g/mol.

In another embodiment, the SBC can comprise a block copolymer having a structure $(A-B)_2X$, where the Mp of the block copolymer having structure $(A-B)_2$ is 1.5 to 2.5 times the Mp of the $(A-B)_1$ diblock copolymer having a Mp from 13,400 g/mol to 250,000 g/mol.

In embodiments, the SBC is a selectively hydrogenated block copolymer having an A block and a B or $B_1$ block and having the general formula: A-B-A, $(A-B_1)_n$, $(A-B_1)_nA$, $(A-B_1)_nX$ or mixtures thereof, wherein: (a) the A block is a polystyrene block; (b) the B block is a polydiene block, selected from the group consisting of polybutadiene, polyisoprene and mixtures thereof, having a Mp of from 57,000 to 100,000; (c) the $B_1$ block is a polydiene block, selected from the group consisting of polybutadiene, polyisoprene and mixtures thereof, having a Mp of from 28,000 to 50,000; (d) in has a value of 2 to 6 and X is a coupling agent residue; (e) the styrene content of the block copolymer is from 13 percent to 25 percent; (f) the vinyl content of the polydiene block prior to hydrogenation is from 60 to 85 mol percent; (g) the block copolymer includes less than 15 weight percent lower molecular weight units having the general formula: A-B or $A-B_1$; wherein A, B and $B_1$ are as already defined; and (h) the Mp of each of the A blocks is from 5,000 to 7,000.

In embodiments, the SBC is a linear hydrogenated block copolymer consisting of a structure A1-B1-A2-B2. Each polymer block B1 and B2 comprises polymerized, hydrogenated diene monomer units wherein at least 90% of the olefinically unsaturated double bonds in the unhydrogenated polymer block are hydrogenated, and wherein the 1,2-vinyl bond content is greater than 25% and less than 60%. Each polymer block A1 and A2 comprises polymerized mono alkenyl arene monomer units. The Mp of the blocks are: between 6,000 and 8,000 g/mol for the A1 block, between 55,000 and 70,000 g/mol for the B1 block, between 7,500 and 9,000 g/mol for the A2 block and between 5,000 and 12,000 g/mol for the B2 block. The linear hydrogenated block copolymer has an order-disorder temperature of less than 240° C., a melt flow rate of less than 2.0 g/10 minutes as measured at 200° C. under a load of 5 kg in accordance with ASTM D1238, and a melt flow rate of between 4.0 and 20.0 g/10 minutes as measured at 250° C. under a load of 5 kg in accordance with ASTM 1238D.

In embodiments, the SBC is a selectively hydrogenated block copolymer of formula S-E, and having a Mp of from 125,000 g/mol to 300,000 g/mol, where "S" is a polymer block of a mono alkenyl arene, and prior to hydrogenation, "E" is a polymer block of at least one diene.

In embodiments, the conjugated dienes of the B blocks are independently selected from 1,3-butadiene and substituted butadienes, such as, for example, isoprene, piperylene, 2,3-dimethyl-1,3-butadiene, and 1-phenyl-1,3-butadiene, or mixtures thereof. Of these, isoprene and 1,3-butadiene are the most preferred with 1,3-butadiene being the more preferred of the two.

In the above embodiments, the block copolymer can be selectively hydrogenated using methods known in the art.

In embodiments, the diene block can have from greater than 70 mol %, or greater than 80 mol %, or greater than 90 mol % of the diene double bonds hydrogenated.

In embodiments, the Mp of the SBC can vary over a broad range, such as from 6,000 to 1,000,000 g/mol, or from 50,000 to 500,000 g/mol. If the SBC has a branched or star-shaped structure, the Mp can even exceed 1,000,000 g/mol.

In embodiments, the SBC polymer used for making the FFSBC can also contain one or more additives, such as nucleating agents, clarifying agents, antioxidant agents, UV stabilizers, oxygen scavengers, optical brighteners, anti-slip agents, anti-blocking agents, friction modifiers, waxes, pigments, coloring dyes, and mixtures thereof. These additives can be incorporated in the commercial SBC polymers during the time of production.

The amount of FFSBC in the composition ranges from 5 to 30 wt. %, or at least 10 wt. %, or from 12 to 25 wt. %. The SBC is incorporated into the molding composition as (dry blended) free-flowing granules or crumbs, after being coated or dusted with a functional dusting agent, with >80 vol. % of the crumbs comprising the SBC do not adhere to one another.

Functional Dusting Agent

The SBC is coated with a functional dusting agent having a maximum particle size of 100 microns. A functional dusting agent is a functional agent that in addition to the particle size also has a functional property. When the functional dusting agent is incorporated into the composition by "dusting" or "coating" the SBC granules or crumbs, a free-flowing SBC (FFSBC) is obtained.

In embodiments, the additive used as the functional dusting agent includes one or more members selected from the group consisting of nucleating agents, clarifying agents, antioxidants, UV stabilizers, oxygen scavengers, optical brighteners, anti-slip agents, anti-blocking agents, friction modifiers, waxes, pigments, and coloring dyes.

In embodiments, the functional dusting agent is one or more members having a particle size of 100 microns or less and selected from the group consisting of modified sorbitols, benzoic acid salts, substituted benzoic acid salts, dicarboxylate metal salts, hexahydrophthalic acid metal salts, phenylphosphonic acid salts, phosphate ester salts, glycerolate salts, norbornane carboxylic acid salts, diamides, trisamides and derivatives thereof, tetramides, pine rosin derivatives, acetals and derivatives thereof, di-acetal derivatives, 2,6-naphthalene dicarboxamides, and polyvinylcyclohexanes.

In embodiments, the functional dusting agent is based on an organic clarifying agent, such as a modified sorbitol selected from the group consisting of 1,2,3-tridesoxy-4,6:5,7-bis-O-[(4-propylphenyl)methylene]nonitol, 1,3:2,4-bis(3,4-dimethylbenzylidene)sorbitol, 1,3:2,4-bis(p-methylbenzylidene)sorbitol, and 1,3:2,4-dibenzylidenesorbitol, and a trisamide such as 1,3,5-tris(2,2-dimethylpropionylamino) benzene.

In embodiments, the functional dusting agent is selected from the group consisting of trisamide derivatives or acetal agents, e.g., trisamide and acetal compounds that are the condensation product of a polyhydric alcohol and an aromatic aldehyde. Examples include amide derivatives of benzene-1,3,5-tricarboxylic acid, amide derivatives of (N-(3,5-bis-formylamino-phenyl) formamide (e.g., (N-[3,5-bis-(2,2-dimethyl-propionylamino)-phenyl]-2,2-dimethyl-propionamide), derivatives of 2-carbamoyl-malonamide (e.g., N,N'-bis-(2-methyl-cyclohexyl)-2-(2-methyl-cyclohexylcarbamoyl)-malonamide), and combinations thereof. Examples of acetal clarifying agents include the condensation product of a polyhydric alcohol and an aromatic aldehyde.

In embodiments, the functional dusting agent is a sorbitol derivative, e.g., bis(3,4-dimethylbenzylidene) sorbitol (DMDBS), dibenzylidene sorbitol (DBS), and mixtures thereof.

In embodiments, the functional dusting agent is selected from norbornane carboxylic acid salts and phosphate ester salts. Examples include 2,2'-methylene-bis-(4,6-di-tert-butylphenyl)phosphate salts (e.g., sodium 2,2'-methylene-bis-(4,6-di-tert-butylphenyl)phosphate or aluminum 2,2'-methylene-bis-(4,6-di-tert-butylphenyl)phosphate), bicyclo [2.2.1]heptane-2,3-dicarboxylate salts (e.g., disodium bicyclo[2.2.1]heptane-2,3-dicarboxylate and calcium bicycle [2.2.1]heptane-2,3-dicarboxylate), cyclohexane-, 2-dicarboxylate salts (e.g., calcium cyclohexane-1,2-dicarboxylate, monobasic aluminum cyclohexane-1,2-dicarboxylate, dilithium cyclohexane-1,2-dicarboxylate, strontium cyclohexane-1,2-dicarboxylate), and combinations thereof.

In embodiments, the functional dusting agent is a metal salt of a phenylphosphonic acid, comprising primary particles having a mean aspect ratio of about two or more, as disclosed in U.S. Pat. No. 8,835,542 B2, incorporated herein by reference.

In embodiments, the functional dusting agent is selected from phosphate derivative clarifiers, which also function as nucleating agents, e.g., such as 2,2'-methylene bis (2,4-di-tert-butylphenyl)phosphate lithium salt.

In embodiments, the functional dusting agent is a micronized powder form of an anti-microbial additives like zinc oxide (ZnO), silver ion compounds like colloidal silver, nanoparticluate silver, silver ceramics, silver zeolites, and silver glass, 2,4,4'-trichloro-2'-hydroxydiphenyl ether and zinc pyrithione etc.

In embodiments, the functional dusting agent is selected from propyl sorbital based clarifying agents, e.g., 1,2,3-tridesoxy-4,6:5,7-bis-O-[(4-propylphenyl) methylene]nonitol, 1,3:2,4-bis(p-methylbenzylidene)sorbitol, 1,3:2,4-dibenzylidenesorbitol, or 1,3:2,4-bis(3,4-dimethylbenzylidene)sorbitol, a phosphate based nucleating agent such as aluminum hydroxy{bis[2,4,8,10-tetrakis(1,1-dimethylethyl)-6-hydroxy-12H-dibenzo[d,g] [1,3,2]dioxaphosphocin 6-oxidato}, methylene-bis(4,6-di-ter-butylphenyl) phosphate sodium salt, and a trisamine based clarifying agent such as 1,3,5-tris(2,2-dimethylpropionylamino)benzene.

In embodiments, the functional dusting agent for coating the SBC can further comprise up to 500 phr, or 50 to 300 phr, or 100 to 250 phr, of a filler, e.g., fumed silica, precipitated silica, micronized antioxidant powders, micronized polymer powders, calcium carbonate, aluminum silicate, clays, talc, and the like, based on 100 parts of functional dusting agent (i.e., parts per hundred parts or phr).

The functional dusting agent is present in amounts of <2 wt. % (based on the total weight of the SBC), or <1.5 wt. %, or <1 wt. %, or <0.7 wt. %, or less than 0.5 wt. %, or <0.25 wt. %, or from 1000 ppm to 3000 ppm of the SBC. In embodiments, the functional dusting agent is present in 0.05 to 1 wt. %, or >0.1 wt. %, or from 0.2 to 0.8 wt. % of the SBC.

Optional Components

In addition to the components described above, the composition may further comprise other conventional ingredients such as antioxidants, fillers, UV stabilizers, slipping agents, flame retarders, blowing agents, antistatic agent, and the like. Such ingredients are only present in small quantities, e.g. up to 2 wt. % based on the total weight of the SBC composition. Some filler materials can also be present in quantities greater than 2 wt. %.

Method for Making

For obtaining a FFSBC where the SBC component is a selectively hydrogenated form of SBC (i.e., HSBC), the HSBC form can be generated by hydrogenating the precursor SBC using methods known in the art, e.g., as disclosed in U.S. Pat. Nos. 3,595,942; 3,634,549; 3,670,054; and 3,700,633, incorporated herein by reference. After hydrogenation, the solvent is removed from the solution containing the polymer. In the crumbing step, the slurry is subject to dehydration/drying to generate crumbs having a pre-determined moisture content. Alternatively, the HSBC (or SBC if hydrogenation step is not performed) may be melt formed into pellets after dehydration and drying. After crumbing or pelletization, the dusting with the functional dusting agent can be done via any of batch, semi-batch, and continuous basis by mixing in a suitable equipment, with the dusting agent being added in an amount for the SBC crumb or pellet to be sufficiently coated with the dusting agent for a free-flowing property.

The FFSBC can be incorporated into the composition with polyolefin (and optional components) by dry blending. The FFSBC also allows other agents to be incorporated into the formulation in a form that can be efficiently blended into the polyolefin and other optional components, for use in molding or extrusion directly, without the need for the components to be pre-compounded, prior to molding or extrusion forming articles. Exemplary processes for forming articles with the dry-blended composition include but are not limited to injection molding, extrusion, extrusion blow molding, rotational molding, thermal forming, and injection blow molding.

In embodiments, articles are formed by injection molding, wherein the dry-blended composition is melt-blended in the injection molding machine and then injected into the mold.

Properties

The dry-blends based on the FFSBC, described above, can be subjected to melt-mixing by processes such as molding or extrusion to form articles having excellent impact and shatter resistance properties. In embodiments, articles formed have a notched Izod impact strength of 50-600 J/m, or at least 42 J/m, or at least 52 J/m, or at least 62 J/m, measured at about 23° C. according to ASTM D1003.

Formed articles have excellent haze optical properties (as measured using ASTM D-1003). In an embodiment, the articles formed have a haze value of 95% or lower, or 90% or lower, or 1-5%, or 5-10%, or 10-20%, or 25-50%, or 55-95%.

In another embodiment, the articles formed have a haze value that is at least 2.5%, alternately 5%, alternately 10%, alternately 20% lower than the haze of articles made from otherwise identical compositions wherein the functional dusting agent, polyolefin and the SBC are pre-compounded and formed into pellets for subsequent use in a molding or extrusion process. The use of the FFSBC eliminates the process step of forming the pre-compounded formulation (pre-compounding step) prior to injection/extrusion.

Applications

The composition comprising polyolefin and the FFSBC is suitable for use in extrusion, or molding applications, e.g., injection molding or extrusion blow molding, forming articles such as medical devices (e.g., pre-filled syringes for retort applications, intravenous supply containers, and blood collection apparatus), food packaging, liquid containers (e.g., containers for drinks, medications, personal care compositions, shampoos, and the like), toys, apparel cases, microwavable articles, shelving, cabinet doors, mechanical parts, automobile parts, sheets, pipes, tubes, rotationally molded parts, blow molded parts, films, fibers, and the like.

Examples

The invention is further illustrated by the following examples and are not intended to limit the scope of the disclosure. The following components were used in the examples.

SBC1 is a linear triblock copolymer with a styrene/rubber ratio of 19/81, a diblock content of between 5 and 7 wt. %, and a melt index of 75 g/10 (5 kg) at 230° C.

SBC2 is a linear triblock copolymer with a diblock content of between 5 and 7 wt. %, a styrene/rubber ratio of 13/87, and a melt index 13 g/10 (5 kg) at 230° C.

Functional Dusting Agent 1 or FDA1 is a bis-(4-propylbenzylidene) propyl sorbitol.

Functional Dusting Agent 2 or FDA2 is a trisamide, e.g., 1,3,5-tris(2,2-dimethylpropionylamino)benzene.

Polyolefin 1 or PP1 is a polypropylene random copolymer, having a melt flow rate (230° C./2.16 kg) of 12 g/10 min. per ASTM D1238, and a density of 0.90 g/cm$^3$ (23° C.).

Polyolefin 2 or PP2 is a homopolymer polypropylene having a melt flow rate (230° C./2.16 kg) of 5 g/10 min. per ASTM D1238, and a density of 0.90 g/cm$^3$ (23° C.).

Antioxidant or AO is 1,3,5-trimethyl-2,4,6-tris(3,5-di-tert-butyl-4-hydroxybenzyl)benzene.

EXAMPLES

The following examples are provided to illustrate the disclosure, and not intended to limit the scope of the disclosure.

Example 1

A number of molding compositions were formulated according to the compositions shown in Table 1.

Blend 1, containing PP1 only, was injection molded at 190-220° C. on a Krauss injection molder with highly polished molds and conditioned at 23° C. and 50% relative humidity for at least 24 hours before testing.

Blend 2 was dry blended by mixing PP1 and SBC1 along with AO in a closed plastic bag and lightly tumbled at room temperature followed by injection molding at similar conditions as noted above.

Blend 3 was pre-compounded such that PP1 and SBC1 along with AO was first melt-processed in a 25 mm twin-screw extruder at 190-220° C. and then pelletized prior to injection molding and conditioning as noted above.

Blends 4 through 7 utilized SBC1 dusted or coated with the functional dusting agent (FDA1 or FDA2), at an amount such that the final composition for the blend is noted in Table 1, prior to dry-blending or pre-compounding with PP1 and AO followed by injection molding and conditioning in a similar fashion as the other blends.

The results are shown in Table 1.

Example 2

A number of molding compositions were formulated according to the compositions shown in Table 2.

Blend 1, containing PP1 only, was injection molded at 190-220° C. on a Krauss injection molder with highly polished molds and conditioned at 23° C. and 50% relative humidity for at least 24 hours before testing.

Blend 8 was dry blended by mixing PP1 and SBC2 along with AO in a closed plastic bag and lightly tumbled at room temperature followed by injection molding at similar conditions as noted above.

Blend 9 was pre-compounded such that PP1 and SBC2 along with AO was first melt-processed in a 25 mm twin-screw extruder at 190-220° C. and then pelletized prior to injection molding and conditioning as noted above.

Blends 10 through 15 utilized SBC2 dusted or coated with the functional dusting agent (FDA1 or FDA2), at an amount such that the final composition for the blend is noted in Table 2, prior to dry-blending or pre-compounding with PP1 and AO followed by injection molding and conditioning in a similar fashion as the other blends.

The results are as shown in Table 2.

Example 3

A number of molding compositions were formulated according to the compositions shown in Table 3.

Blend 16 was injection molded at 190-220° C. on a Krauss injection molder with highly polished molds and conditioned at 23° C. and 50% relative humidity for at least 24 hours before testing.

Blend 17 was dry blended by mixing PP2 and SBC1 along with AO in a closed plastic bag and lightly tumbled at room temperature followed by injection molding and conditioning as noted above.

Blend 18 was pre-compounded such that PP2 and SBC1 along with AO was first melt-processed in a 25 mm twin-screw extruder at 190-220° C. and then pelletized prior to injection molding and conditioning as noted above.

The results are as shown in Table 3.

Notched Izod Impact testing was done at 23° C. on notched 3 mm thick injection molded bars according to ASTM D 256 on all examples. The results reported was the average of bars with the notch close to the injection molding gate of the bar and at the far end of the bar from the gate. Results are reported in J/m.

The haze optical properties for all examples were measured on a BYK Gardner Haze Guard Plus instrument according to ASTM D 1003. Results are reported in % haze.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

TABLE 1

| | Blend 1 | Dry-blended Blend 2 | Pre-compounded Blend 3 | Dry-blended Blend 4 | Pre-compounded Blend 5 | Dry-blended Blend 6 | Pre-compounded Blend 7 |
|---|---|---|---|---|---|---|---|
| Composition (wt %) | | | | | | | |
| PP1 | 100.00 | 89.80 | 89.80 | 89.70 | 89.70 | 89.70 | 89.70 |
| SBC1 | — | 10.00 | 10.00 | 10.00 | 10.00 | 10.00 | 10.00 |
| FDA1 | — | — | — | 0.10 | 0.10 | — | — |
| FDA2 | — | — | — | — | — | 0.10 | 0.10 |
| AO | — | 0.20 | 0.20 | 0.20 | 0.20 | 0.20 | 0.20 |
| Test Property | | | | | | | |
| Haze (%) | 93.6 | 85.7 | 95.2 | 82.2 | 88.1 | 86.4 | 90.11 |
| Impact Strength @ 23° C. (J/m) | 51.7 | 89.7 | 95.8 | 94.4 | 101.1 | 146.9 | 225.0 |

TABLE 2

| | Blend 1 | Dry-blended Blend 8 | Pre-compounded Blend 9 | Dry-blended Blend 10 | Pre-compounded Blend 11 | Dry-blended Blend 12 | Pre-compounded Blend 13 | Dry-blended Blend 14 | Pre-compounded Blend 15 |
|---|---|---|---|---|---|---|---|---|---|
| Composition (wt %) | | | | | | | | | |
| PP | 100.00 | 89.80 | 89.80 | 89.70 | 89.70 | 89.79 | 89.79 | 89.70 | 89.70 |
| SBC2 | — | 10.00 | 10.00 | 10.00 | 10.00 | 10.00 | 10.00 | 10.0 | 10.00 |

TABLE 2-continued

| | Blend 1 | Dry-blended Blend 8 | Pre-compounded Blend 9 | Dry-blended Blend 10 | Pre-compounded Blend 11 | Dry-blended Blend 12 | Pre-compounded Blend 13 | Dry-blended Blend 14 | Pre-compounded Blend 15 |
|---|---|---|---|---|---|---|---|---|---|
| FDA1 | — | — | — | 0.10 | 0.10 | — | — | — | — |
| FDA2 | — | — | — | — | — | 0.01 | 0.10 | 0.10 | 0.10 |
| AO | — | 0.20 | 0.20 | 0.20 | 0.20 | 0.20 | 0.20 | 0.20 | 0.20 |
| Test Property | | | | | | | | | |
| Haze (%) | 93.6 | 85.6 | 95.1 | 81.3 | 87.8 | 59.1 | 65.3 | 70.3 | 89.5 |
| Impact Strength @ 23° C. (J/m) | 51.7 | 163.1 | 117.4 | 403.3 | 401.6 | 489.4 | 415.0 | 301.1 | 401.4 |

TABLE 3

| | Blend 16 | Dry-blended Blend 17 | Pre-compounded Blend 18 |
|---|---|---|---|
| Composition (wt %) | | | |
| PP2 | 100.00 | 89.80 | 89.80 |
| SBC1 | — | 10.00 | 10.00 |
| AO | — | 0.20 | 0.20 |
| Test Property | | | |
| Haze (%) | 98.5 | 93.0 | 95.9 |
| Impact Strength @ 23° C. (J/m) | 39.9 | 56.1 | 57.5 |

The invention claimed is:

1. A molding composition comprising:
   75 to 95 wt. % of a polyolefin polymer selected from polypropylene homopolymers, polypropylene copolymers, polypropylene impact copolymers, and mixtures thereof; and
   5 to 25 wt. % of a styrenic block copolymer coated with a functional dusting agent having a maximum particle size of 100 microns, in an amount of less than 1 wt. % and at least 0.01 wt. %, based on total weight of the styrenic block copolymer,
   wherein the functional dusting agent is selected from modified sorbitols, benzoic acid salts, substituted benzoic acid salts, dicarboxylate metal salts, hexahydrophthalic acid metal salts, phenylphosphonic acid salts, phosphate ester salts, glycerolate salts, norbornane carboxylic acid salts, diamides, tris-amides and derivatives thereof, tetramides, pine rosin derivatives, acetals and derivatives thereof, di-acetal derivatives, 2,6-naphthalene dicarboxamides, polyvinylcyclohexanes and combinations thereof;
   wherein the functional dusting agent is used to coat the styrenic block copolymer forming a coated styrenic block copolymer prior to mixing the coated styrenic block copolymer with the polyolefin polymer to form the molding composition;
   wherein the coated styrenic block copolymer is free-flowing, requiring a force of less than 400 lbs/ft² to break in a blocking test;
   wherein a molded article comprising the molding composition has a notched Izod impact strength of at least 42 J/m, measured at 23° C. in accordance with ASTM D 256, and a haze value, measured according to ASTM D 1003, of 95% or lower.

2. The molding composition of claim 1, wherein the molded article has a haze value which is at least 2.5% less, compared to a reference molded sample formed from a pre-compounded composition comprising same amounts of the polyolefin, styrenic block copolymer, and functional dusting agent.

3. The molding composition of claim 1, wherein the molded article comprising the molding composition has a notched Izod impact strength of 50-600 J/m, measured according to ASTM D 1003.

4. The molding composition of claim 1, further comprising at least one additive selected from antioxidants, fillers, UV stabilizers, slipping agents, flame retarders, blowing agents, and antistatic agents, and wherein the additive is present in an amount of up to 2 wt. %, based on the overall weight of the molding composition.

5. The molding composition of claim 1, wherein the styrenic block copolymer comprises any of:
   a) a tetra-branched block copolymer (IV) having a styrene equivalent peak molecular weight (Mp) of 53,600 to 1,000,000 g/mol, represented by a formula $(A-B)_4X$;
   b) a tri-branched block copolymer (III) having a Mp of 40,200 to 750,000 g/mol, represented by a formula $(A-B)_3X$;
   c) a di-branched block copolymer (II) having a Mp of 26,800 to 500,000 g/mol, represented by a formula $(A-B)_2X$; and
   d) a linear diblock copolymer (I) having a Mp of 13,400 to 250,000 g/mol, represented by a formula A-B;
   wherein A represents a polymer block of a mono alkenyl arene; B represents a polymer block of at least one conjugated diene; and X represents residues of a coupling agent.

6. The molding composition of claim 1, wherein the styrenic block copolymer consists essentially of a diblock copolymer comprising one block of a monovinylaromatic hydrocarbon and one block of a conjugated diene, and has a Mp from 13,400 g/mol to 250,000 g/mol, a vinyl content from 5 to 80 mol % based on the number of repeat monomer units in the conjugated diene block, and a polystyrene content from 20 wt. % to 55 wt. %.

7. The molding composition of claim 1, wherein the styrenic block copolymer consists essentially of a triblock copolymer comprising at least two blocks of the mono alkenyl arene and at least one block of the conjugated diene;
   wherein the triblock copolymer has
   a linear block copolymer having a sequential A-B-A structure, or a radial block copolymer having a $(A-B)_nX$ structure, where n=2 to 6, A represents a polymer block of a mono alkenyl arene, B represents a polymer block of at least one conjugated diene, and X is residue of a coupling agent;

a Mp of 10.00 g/mol to 500,000 g/mol,
a vinyl content from 5 to 80 mole percent based on the number of repeat monomer units in the conjugated diene block, and
a polystyrene content from 10% to 40%; and
wherein the styrenic block copolymer has a melt index from about <1 g/10 min. to 1,000 g/10 min. as determined by ASTM D-1238, condition G (200° C., 5 kg).

8. The molding composition of claim 7, wherein the triblock copolymer has a structure (A-B)nX, and wherein the $(A-B)_2$ molecular weight is 1.5 to 2.5 times peak molecular weight of the $(A-B)_1$ diblock copolymer.

9. The molding composition of claim 1, wherein the styrenic block copolymer is a linear hydrogenated block copolymer consisting of a structure A1-B1-A2-B2; wherein each polymer block B1 and B2 comprises polymerized, hydrogenated diene monomer units, and each polymer block A1 and A2 comprises polymerized mono alkenyl arene monomer units; and
wherein the linear hydrogenated block copolymer has a Mp between 6,000 and 8,000 g/mol for the A1 block, between 55,000 and 70,000 g/mol for the B1 block, between 7,500 and 9,000 g/mol for the A2 block and between 5,000 and 12,000 g/mol for the B2 block.

10. The molding composition of claim 1, wherein the styrenic block copolymer is selectively hydrogenated.

11. A process for forming an article, comprising:
a) providing a polyolefin polymer selected from polypropylene homopolymers, polypropylene copolymers, polypropylene impact copolymers, and mixtures thereof;
b) providing a styrenic block copolymer;
c) providing a functional dusting agent selected from modified sorbitols, benzoic acid salts, substituted benzoic acid salts, dicarboxylate metal salts, hexahydrophthalic acid metal salts, phenylphosphonic acid salts, phosphate ester salts, glycerolate salts, norbornane carboxylic acid salts, diamides, trisamides and derivatives thereof, tetramides, pine rosin derivatives, acetals and derivatives thereof, di-acetal derivatives, 2,6-naphthalene dicarboxamides, polyvinylcyclohexanes and combinations thereof, and wherein the functional dusting agent has a maximum particle size of 100 microns;
d) coating the styrenic block copolymer with the functional dusting agent forming a coated styrenic block copolymer;
e) mixing the coated styrenic block copolymer with the polyolefin polymer forming a molding composition; and
f) forming an article from the molding composition;
wherein the molding composition has 5 to 25 wt. % of the coated styrenic block copolymer and 75 to 95 wt. % of the polyolefin;
wherein the functional dusting agent for coating the stytenic block copolymer is present in an amount of less than 1 wt. % and at least 0.01 wt. %, based on the weight of the styrenic block copolymer;
wherein the coated styrenic block copolymer requires force of less than 400 lbs/ft$^2$ to break in a blocking test,
wherein the article has a notched Izod impact strength of 42 J/m or higher, measured at 23° C. in accordance with ASTM D256, and a haze value of 95% or lower.

12. The process of claim 11, wherein the article is formed by molding, and wherein forming the article comprises:
melt-blending the molding composition;
injecting the molding composition into a mold forming a molded article.

13. The process of claim 11, wherein the article has a haze value that is at least 2.5% less, compared to a reference article formed by molding a pre-compounded composition comprising same amounts of polyolefin, styrenic block copolymer, and functional dusting agent.

14. The process of claim 11, wherein the mixing step further comprises mixing at least an additive selected from antioxidants, fillers, UV stabilizers, slipping agents, flame retarders, blowing agents, and antistatic agents into the molding composition.

15. The process of claim 11, wherein the styrenic block copolymer comprises any of:
a) a tetra-branched block copolymer (IV) having a styrene equivalent peak molecular weight (Mp) of 53,600 to 1,000,000 g/mol, represented by a formula $(A-B)_4X$;
b) a tri-branched block copolymer (III) having a Mp of 40,200 to 750,000 g/mol, represented by a formula $(A-B)_3X$;
c) a di-branched block copolymer (II) having a Mp of 26,800 to 500,000 g/mol, represented by a formula $(A-B)_{2X}$; and
d) a linear diblock copolymer (I) having a Mp of 13,400 to 250,000 g/mol, represented by a formula A-B;
wherein A represents a polymer block of a mono alkenyl arene; B represents a polymer block of at least one conjugated diene; and X represents residues of a coupling agent.

16. The process of claim 11, wherein the styrenic block copolymer consists essentially of a diblock copolymer comprising one block of a monovinylaromatic hydrocarbon and one block of a conjugated diene, and has a Mp from 13,400 g/mol to 250,000 g/mol, a vinyl content from 5 to 80 mol % based on the number of repeat monomer units in the conjugated diene block, and a polystyrene content from 20 wt. % to 55 wt. %.

17. The process of claim 11, wherein the styrenic block copolymer consists essentially of a triblock copolymer comprising at least two blocks of the mono alkenyl arene and at least one block of the conjugated diene;
wherein the triblock copolymer has
a linear block copolymer having a sequential A-B-A structure, or a radial triblock copolymer having a $(A-B)_nX$ structure, where n=2 to 6, A represents a polymer block of a mono alkenyl arene, B represents a polymer block of at least one conjugated diene, and X is residue of a coupling agent;
a Mp of 10.00 g/mol to 500,000 g/mol,
a vinyl content from 5 to 80 mole percent based on the number of repeat monomer units in the conjugated diene block, and
a polystyrene content from 10% to 40%; and
wherein the styrenic block copolymer has a melt index from about <1 g/10 min. to 1,000 g/10 min. as determined by ASTM D-1238, condition G (200° C., 5 kg).

18. The process of claim 17, wherein the triblock copolymer has a structure (A-B)nX, and wherein the $(A-B)_2$ molecular weight is 1.5 to 2.5 times peak molecular weight of the $(A-B)_1$ diblock copolymer.

19. The process of claim 11, wherein the styrenic block copolymer is a linear hydrogenated block copolymer consisting of a structure A1-B1-A2-B2; wherein each polymer block B1 and B2 comprises polymerized, hydrogenated diene monomer units, and each polymer block A1 and A2 comprises polymerized mono alkenyl arene monomer units; and
wherein the linear hydrogenated block copolymer has a Mp between 6,000 and 8,000 g/mol for the A1 block, between 55,000 and 70,000 g/mol for the B1 block, between 7,500 and 9,000 g/mol for the A2 block and between 5,000 and 12,000 g/mol for the B2 block.

20. The process of claim 11, wherein the styrenic block copolymer is selectively hydrogenated.

* * * * *